United States Patent
Barnett et al.

(10) Patent No.: US 7,836,183 B1
(45) Date of Patent: Nov. 16, 2010

(54) INTERNET AUDIO SCANNER AND METHOD

(75) Inventors: Richard E. Barnett, Newton, MA (US); Terence Sean Sullivan, Somerville, MA (US)

(73) Assignee: RangeCast Technologies, LLC, Ely, NV (US)

( * ) Notice: Subject to any disclaimer, the term of this patent is extended or adjusted under 35 U.S.C. 154(b) by 1230 days.

(21) Appl. No.: 11/418,960

(22) Filed: May 5, 2006

(51) Int. Cl.
*G06F 15/173* (2006.01)

(52) U.S. Cl. .................. 709/226; 709/202; 709/203; 709/217; 709/219; 709/229; 709/231; 709/245

(58) Field of Classification Search .................. 709/202, 709/203, 217, 219, 226, 229, 231, 245
See application file for complete search history.

(56) References Cited

U.S. PATENT DOCUMENTS

| | | | |
|---|---|---|---|
| 5,479,474 A * | 12/1995 | Schwartzman et al. | 455/570 |
| 6,289,207 B1 | 9/2001 | Hudecek et al. | |
| 6,496,687 B1 | 12/2002 | Switlyk | |
| 6,584,439 B1 * | 6/2003 | Geilhufe et al. | 704/270 |
| 6,684,249 B1 | 1/2004 | Frerichs et al. | |
| 6,769,028 B1 | 7/2004 | Sass et al. | |
| 6,804,510 B1 * | 10/2004 | Bates et al. | 455/414.4 |
| 6,920,479 B2 | 7/2005 | McDowall et al. | |
| 7,489,946 B2 * | 2/2009 | Srinivasan et al. | 455/556.1 |
| 2001/0039187 A1 * | 11/2001 | Shively | 455/412 |
| 2002/0193989 A1 * | 12/2002 | Geilhufe et al. | 704/208 |
| 2003/0093281 A1 * | 5/2003 | Geilhufe et al. | 704/275 |
| 2006/0234769 A1 * | 10/2006 | Srinivasan et al. | 455/556.1 |
| 2007/0218894 A1 * | 9/2007 | Harris et al. | 455/426.1 |

* cited by examiner

*Primary Examiner*—Liangche A Wang
(74) *Attorney, Agent, or Firm*—Dan Brown Law Office; Daniel R. Brown

(57) ABSTRACT

An apparatus for processing signals produced by signal sources, including a first signal source that is a first server of streaming audio signals, which include intermittent audio content, and which is located at an address on a network. The apparatus includes a network interface and a processor that selects the first signal source by outputting the address of the first server to the network interface, thereby establishing a network connection. The apparatus also includes a threshold detector coupled to receive streaming audio signals through the network interface, and that has a detector output with an active state that indicates that the intermittent audio content presently meets a threshold value. The processor further couples the streaming audio content to an output circuit if the detector output is active. The apparatus may further include a scanning radio receiver that is used as an alternative source for audio signals with intermittent content.

39 Claims, 10 Drawing Sheets

INTERNET SCANNER FEED STATION

INTERNET SCANNER RECEIVER STATION

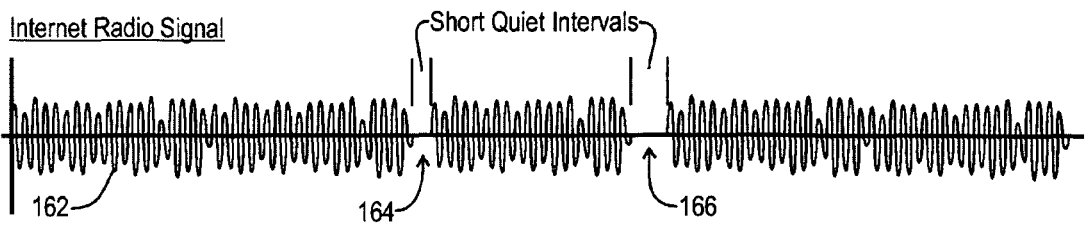
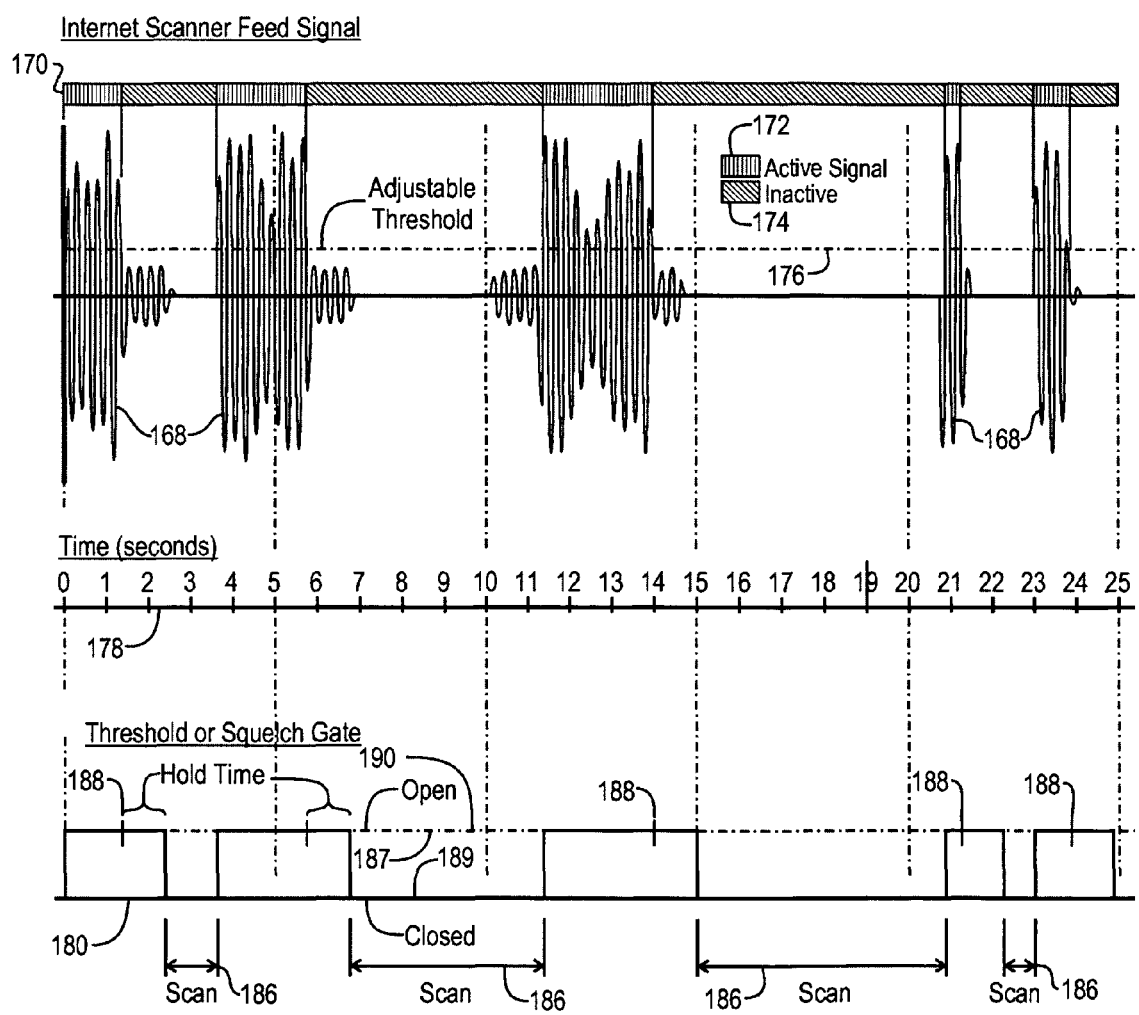
Fig. 12

INTERNET AUDIO SCANNER AND METHOD

BACKGROUND OF THE INVENTION

1. Field of the Invention

The present invention relates to Internet coupled audio communications. More specifically, the present invention relates to an apparatus and method for scanning streaming Internet audio feeds and broadcast radio signals for the reception of active audio signals within intermittent audio content.

2. Description of the Related Art

Scanning radio receivers, commonly known as "police scanners" or simply "scanners", allow users to listen to police, fire, aircraft, marine, business and other manner of one-way and two-way radio communications across a broad spectrum of frequencies, typically ranging from 25 MHz to 1300 MHz. Most scanners have a channel memory that is used to store one or more receiver frequencies, or indicia of frequency, that can be recalled by referencing a channel number, thereby simplifying the entry of desired reception frequencies. Various types of scanners are known, some operating in a few bands of frequencies with limited channel memory capacity, others being full-featured models that cover all the available bands and including generous channel memory capacity. Scanners are enabled to sequentially change channels, thereby scanning through a list of frequencies, searching for broadcasts comprised of intermittent audio content that may be of interest to a listener. Scanners are able to receive local radio broadcasts, with the range limited by transmitter power and receiver sensitivity. Typically maximum listening ranges are approximately twenty-five to forty miles.

Scanner radio receivers employ some form of squelch control so that noise and undesirable communications are not routed through to a loudspeaker or earphone. Carrier squelch can be used, which gates received audio to a loudspeaker based on the signal-to-noise ratio or carrier-to-noise ratio of the receiver discriminator output. Other systems employ out of band tones that are detected to control a squelch gate. One such system employs plural sub-audible tones, and is referred to as a continuously tone coded squelch system ("CTCSS"). The receiver channel includes the frequency of the CTCSS tone, and checks for that particular one of the plural tones based on the channel programming, and detection of a matching tone enables the squelch gate of the receiver. The tones are stored in the channel memory, linked to the corresponding frequency of reception. Thus, when a channel is selected for reception, the scanner recalls both the frequency of reception and the squelch tone. Another squelch system employs digital data fields that are broadcast along with the radio signals, and the receiver looks for a matching digital code. Such systems are referred to as digitally coded squelch systems ("DCS"). Other squelch control systems are known as well. In general, the squelch gate couples audio from the receiver discriminator to an audio output circuit, which may include a loudspeaker, earphone, recorder, or other output device.

Early two-way radio systems employed a single radio frequency or a duplex pair of radio frequencies for two-way communications. Such systems lent themselves well to scanner receiver monitoring because a given two-way radio fleet of users, such as the local police department, could be readily monitored by receiving a single, predetermined, radio frequency. However, heavy radio use demand and congested airways caused manufacturers to develop more efficient radio systems. One solution was the trunked radio system where a group of two to twenty-eight duplex pairs of radio frequencies are allocated together for shared use by plural fleets of users. In a trunked system, talk group identities are assigned to the fleets, which are used to provide receiver squelch gate control for the plural members of the fleet. The difference in a trunked radio system vis-á-vis a conventional system is that the radio frequencies are dynamically allocated during use. As such, a conversation between a dispatcher and a fleet of patrol cars, for example, can change from frequency to frequency within the trunked group of frequencies during the course of a conversation. Suppliers of scanning receivers addressed this difference in functionality by developing radios that could track the talk group identities ("Talk group ID's") and dynamically hop from frequency to frequency as the conversation progressed. The key to radio scanner operation in a trunking environment is to have all of the trunking frequencies for each trunk group stored in the scanner channel memory, typically associated with a system identity ("System ID"), and then track the talk group ID code of the desired fleet, along with the dynamic allocation of the trunking frequencies. In this way, the trunked scanner functions like a conventional scanner from the user's perspective, with the "channel" actually associated with both a trunking system ID and a talk group ID instead of the conventional radio system frequency-to-channel, plus squelch code, correlation.

Scanning enthusiasts frequently look for "the action" in public safety radio systems. These kinds of events include major fires, police chases, airplane crashes and other breaking news kinds of events. One problem is that breaking news events happen at distant locations, which are out of the range of the scanner's operating environment. The Internet has been used to increase the useful range of scanner operation. Enthusiasts are now enabled to connect the audio output of the scanner to an Internet streaming audio server computer, and thereby allow other enthusiasts to access the received scanner audio signals over an Internet connection. For example, an Internet connected scanner in Chicago may receive a breaking news car chase, while an enthusiasts in Boston listens to the action on their computer loudspeakers by addressing the streaming audio server in Chicago. In fact, there are hundreds, perhaps thousands of Internet scanner feeds active at any given time, with more becoming active all the time. The challenge to enthusiasts is to find "the action" on the Internet scanner feeds. While scanning enthusiasts are familiar with channel scanning operations in their radio scanners, which enables them to quickly find "the action" in their local region, enthusiasts are frustrated in finding "the action" when surfing Internet scanner feeds. Thus, there is a need in the art for an apparatus and method for providing scanning radio receiver functionality to Internet based scanner feeds.

SUMMARY OF THE INVENTION

The need in the art is addressed by the methods and apparatus of the present invention. A method of processing signals containing intermittent audio content is taught. The method includes selecting a first signal source by addressing a server of streaming audio signals located on a network, and, processing the streaming audio signals if a threshold condition is presently satisfied.

In a specific embodiment of the foregoing method, the threshold condition is a threshold value of the intermittent audio content. In a specific embodiment, the foregoing method further includes selecting a second signal source if the threshold condition is not satisfied. In a refinement to this, the method includes establishing a network connection to the second signal source while the threshold condition is presently satisfied. In another embodiment, where the second signal source is a radio receiver, the method includes controlling the radio receiver to discriminate audio signals from radio signals, and, processing the audio signals if their intermittent audio content meets a squelch threshold.

In specific embodiments, the processing step of the foregoing method can include acoustically reproducing the streaming audio signals, storing the streaming audio signals, or forwarding the streaming audio signals to a destination on the network. In another embodiment where the server of streaming audio signals provides corresponding embedded data, the method further includes displaying the embedded data. In another embodiment, the threshold condition is extracted from the embedded data.

In a specific embodiment, the foregoing method further includes sequentially selecting a present signal source from amongst a list of plural signal sources if the threshold condition is not satisfied, and, processing each presently selected signal source so long as the threshold condition is satisfied. In a refinement to this, wherein the list of plural signal sources includes a priority signal source, the method further includes selecting the priority signal source on a more frequent basis than the other signal sources on the list of plural signal sources. The list of plural signal sources may include network addresses and indicia of radio frequencies.

In other specific embodiments of the foregoing method, the selecting and processing steps are accomplished in a network server computer, in a network client computer, or in a portable computing device. The portable computing device may be a scanning radio receiver. In another specific embodiment, the method includes communicating locally sourced audio content into the network. The locally sourced audio content may be coupled from a radio receiver or a microphone interface circuit. In another specific embodiment, where the threshold condition is a predetermined level of an indicia of signal amplitude, the method includes adjusting the predetermined level to discriminate between intelligible audio and noise within the streaming audio signals.

The present invention also teaches an apparatus for processing signals produced by signal sources, including a first signal source that is a first server of streaming audio signals, which include intermittent audio content, and which is located at an address on a network. The apparatus includes a network interface and a processor that selects the first signal source by outputting the address of the first server to the network interface, thereby establishing a network connection. The apparatus also includes a threshold detector coupled to receive signals through the network interface, and that has a detector output with an active state that indicates that the intermittent audio content presently meets a threshold condition. The processor further couples the streaming audio content to an output circuit if the detector output is active.

In a specific embodiment of the foregoing apparatus, the processor selects a second signal source if the output is inactive. In a refinement to this, the processor addresses the second signal source before the output becomes inactive.

In another specific embodiment, the apparatus includes a radio receiver having a squelch gate circuit with an open state that passes receiver audio signals to a receiver audio output if a squelch threshold value is met. In this embodiment, the processor selects the radio receiver as the second signal source if the detector output is inactive, and also couples the receiver audio signals to the output circuit if the squelch gate circuit is in the open state. In a further refinement, where the radio receiver is a scanning radio receiver, the apparatus includes a memory that stores an indicia of radio frequency coupled to the processor. And, the processor recalls the indicia of radio frequency and controls the scanning radio receiver to receive a radio frequency in accordance therewith.

In other specific embodiments, the output circuit of the apparatus can be an audio frequency amplifier, a memory, or network interface. In another embodiment, where the first server of streaming audio signals provides embedded data corresponding to the streaming audio signals, the apparatus further includes a display coupled to the processor. And, the processor displays a portion of the embedded data on the display. In another embodiment, the processor extracts the threshold condition from the embedded data.

In another specific embodiment, the foregoing apparatus includes a memory coupled to the processor that stores a list of plural signal sources. The processor sequentially selects a present signal source from amongst the list of plural signal sources if the threshold condition is not satisfied. The processor further couples the streaming audio content of the present signal source to the output circuit while the threshold condition is presently satisfied. In a refinement to this, the list of plural signal sources includes network addresses and indicia of radio frequencies.

In other embodiments of the foregoing apparatus, the processor may be a network server computer, a network client computer, or a microcontroller in a scanning radio receiver. In another specific embodiment, the apparatus includes a local audio source circuit coupled to the processor that has a local audio input. The processor converts local audio signals from the local audio input into local streaming audio signals, and couples the local streaming audio signals to the network interface for communications into the network. In a refinement to this embodiment, the local audio input circuit is a microphone interface circuit with a push-to-talk input. Actuation of the push-to-talk input causes the processor to presently convert and couple the local streaming audio signals to the network interface. In another refinement to this embodiment, the apparatus further includes a scanning radio receiver with a received signal output coupled to the local audio input.

In a specific embodiment, where the threshold condition is a predetermined level of an indicia of signal amplitude, the apparatus includes a threshold condition actuator coupled to the processor for adjusting the predetermined level for discrimination between intelligible audio and noise within the streaming audio signals. In another embodiment, the network connection is a peer-to-peer connection. In another embodiment, the network address is an Internet uniform resource locator and the network interface is a TCP/IP compliant interface. In another embodiment, the network interface is an Ethernet interface. In another embodiment, the network interface is a Wi-Fi standard compliant, or other over-the-air transmission method, interface, thereby enabling wireless connection to the network.

BRIEF DESCRIPTION OF THE DRAWINGS

FIG. 11 is an audio waveform illustrating a prior art Internet radio station signal.

FIG. 12 is an audio waveform and Internet scanner squelch gate timing diagram according to an illustrative embodiment of the present invention.

DESCRIPTION OF THE INVENTION

Figure 1:
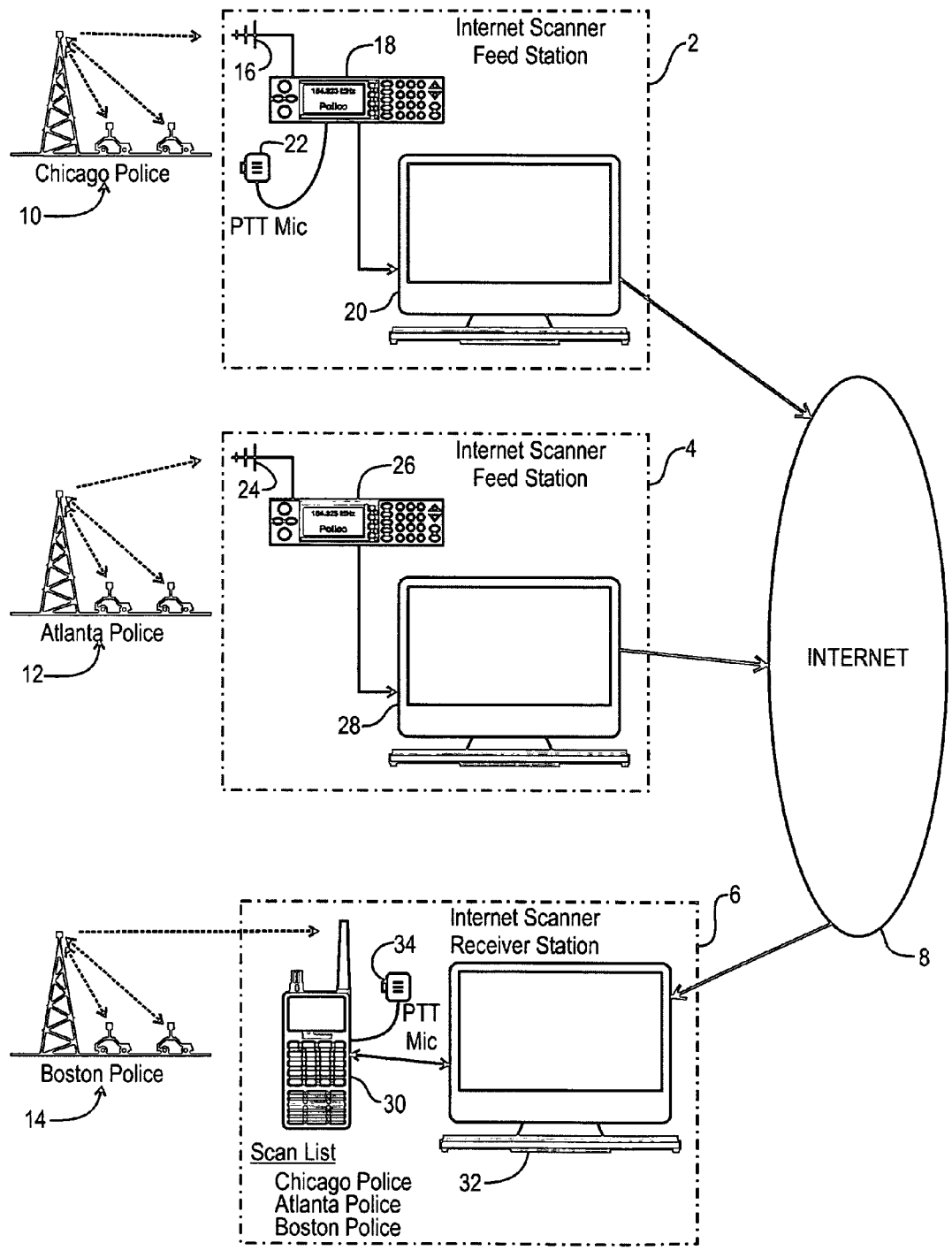
FIG. 1 is an Internet scanner system diagram according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

The present invention advances the art by providing an apparatus and method of sequentially scanning plural network servers of streaming audio for presently active transmissions of intermittent audio content. In a fashion similar to the radio scanner, which scans plural radio frequencies while stopping to receive active transmissions, the teachings of the present invention bring this level of convenience to Internet audio monitoring and reception. A list of plural Internet addresses for sources of streaming audio, including intermittent content audio, are sequentially addressed and tested for presently active content. The apparatus and methods of the present invention may be advantageously combined with the functions of a radio scanner to form a hybrid device that provides the user with both functions. In fact, the present invention provides for the integration of both functions into a single scan list that includes radio channels and Internet addresses, which can be sequenced through, searching for presently active audio content within both classes of intermittent audio content sources.

Internet streaming audio servers are known, and commonly used for applications such as voice over Internet protocol ("VoIP") and Internet radio. Streaming audio servers typically involve continuous one-way audio and one-half of a continuous two-way audio communication. The streaming server provides a continuous open channel of audio, which is appropriate for these applications where continuous audio streaming is desirable. In the situation where a streaming audio server is coupled to an audio source that provides intermitted audio content, the operational issues differ. An example of this is where the audio output of a radio scanner is coupled to an Internet streaming audio server. The server streams continuous audio into the Internet, but the content of that stream may be active or inactive, depending on what is presently being received by the scanning radio. For example, in the case where a scanner is tuned to receive the local fire department dispatch frequency, there may be long periods of quiet that are punctuated with a flurry of activity when a fire call and response occur. Listeners desire to hear the action, but don't want the receiver resources tied up during quite periods when other streaming servers may have action presently happening. In addition to scanner feeds, there are other sources of Internet audio content, such as a push-to-talk ("PTT") microphone, which may only be activated occasionally. The present invention addresses this environment by scanning a list of Internet addresses of streaming servers, testing for active audio content, and then responding according to whether there is presently active content or not.

With respect to the present invention, an Internet server generates an active audio stream, carrying intermittent audio communications, such as transmissions received on a single radio communications frequency, or transmissions received by a scanner sampling multiple radio frequencies. Such a stream is produced by a radio frequency scanner that is coupled to a streaming audio server through an audio circuit interface. There may also be a data interface to the radio scanner, which can provide embedded data corresponding to the intermittent audio content, such as channel description, channel activity, radio frequencies, and other descriptive materials. The embedded data may be communicated in the stream of IP packets transmitted in the same session as the streaming audio or may be transmitted in a separate IP session and synchronized by the transmitting and receiving ends of the session. Thus, the radio scanner audio is presented to a local loudspeaker and to the streaming server. In addition, a PTT microphone can be coupled through the scanner so the that server operator can augment the audio content, which is useful in some situations, including neighborhood crime watch groups, official emergency announcements from NOAA, or civil defense services. There are already a great number of these servers active on the Internet today, with the number increasing all the time. These scanner and server systems are called scanner feeds or Internet scanner feed stations ("ISFS").

Reference is directed to FIG. 1, which is an Internet scanner system diagram according to an illustrative embodiment of the present invention. A first 2 and second 4 Internet scanner feed station ("ISFS") are coupled to the Internet 8. The first ISFS 2 is comprised of a conventional radio scanner 18 that has an antenna 16 configured to receive broadcasts from a public safety radio dispatch system 10, which is the Chicago Police Department in the illustrative embodiment. From time to time, there are dispatch broadcasts that occur in the radio system 10, which are received by the radio scanner 18. An audio port and a data port on the scanner 18 are coupled to a personal computing device 20, which runs suitable streaming server software, thereby coupling the dispatch system 10 audio broadcasts and embedded data into the Internet 8 as streaming audio with intermittent audio content and corresponding data. The streaming audio signal is broadcast as a standard continuous audio stream, such as an MPEG MP3 stream, Real Audio stream, Windows Media Player stream, or other format known to those skilled in the art. The nature of the audio stream is one with intermittent audio content, so there may be extended periods of silence on the audio stream between the discrete communications events. Alternatively, to conserve bandwidth, the stream may be broadcast in a variant format that omits the transmission of audio-content packets during periods of audio silence. Such an approach employs the use of administrative packets, which are sent to maintain stream integrity, validate stream link stability, or convey information about the silent state. The administrative packets can include a threshold condition field, which indicates whether or not there is active audio content being presently communicated into the network. In other embodiments, the discrete active-audio segment can be transmitted as discrete messages, such as standalone MP3 files, or an audio equivalent of an instant message format, without intermediate stream activity during periods of silence. This mode is referred to as a "push" format where these discrete segments are transmitted to known destinations, or using a "pull" format where the discrete segments are transmitted only upon request, and also using an intermediate format where the server automatically sends a "discrete audio segment available" message to known destinations, but only sends the audio itself upon receiving a "request segment" response from a receiver or listener destination. Now, continuing in FIG. 1, note that the scanner 18 has a microphone 22 coupled into its audio circuits such that an operator of the scanner 18 can actuate a PTT switch on the microphone 22, thereby inserting vocal commentary into the audio stream. In all of the audio formats contemplated hereunder, whether the protocol is used to send audio or announce the availability of audio, the server can also transmit embedded data containing alpha tag information describing an audio segment, such as identifying the network or radio frequency source, or the geographic location of the signal. The alpha tags are useful for aiding the client's application of priority rules. The use of alpha tags also mitigates issues related to network lag and buffering, and is useful to transmit timestamp information identifying the date and time of transmissions.

The second ISFS 4 in FIG. 1 includes a scanning radio receiver 26 coupled to an antenna 24 that is configured to receive radio broadcasts from another dispatch radio system 12, which is the Atlanta Police Department in the illustrative embodiment. The intermittent audio content output from the scanner 26 is coupled to a computing device 28, which is also configured to operate as a streaming audio server that is coupled to the Internet 8. Thus, both the first 2 and second 4 ISFS are set up to stream audio into the Internet, either of which can be accessed from anywhere on the Internet by addressing the URL of these servers. In this manner, anyone with a computing device that is coupled to the Internet, and that has browser software and a sound card, can listen to the dispatch broadcasts of the Chicago and Atlanta police.

The presence of the ISFS sources 2, 4 are advantageously utilized by an Internet scanner receiver station ("ISRS") 6 using the teachings of the present invention. In FIG. 1, a personal computing device 32 is coupled to the Internet 8 and provides a TCP/IP connection for addressing and receiving streaming audio content from the two ISFS 2, 4, of the illustrative embodiment. An Internet scanner 30 is coupled to a communication port on the computing device 32, through which streaming audio content and control commands are coupled. Thus, the Internet scanner 30 is enabled to address and receive streaming audio from the Internet. The Internet scanner 30 also includes a conventional radio scanner circuit that enables the scanner 30 to receive local dispatch radio broadcasts from another dispatch radio system 14, which is the Boston Police Department radio system in the illustrative embodiment. A channel memory in the scanner 30 includes a list of "channels" to scan, which includes both the convention radio scanner tuning information and Internet URL addresses for the ISFS sources 2, 4. Thus, the scan list includes channel information for the Chicago Police, the Atlanta Police, and the Boston Police. A user of this device is thereby enabled to receive the local Boston police dispatch calls as well as police calls from across the country, including Chicago and Atlanta police in the illustrative embodiment. When receiving local radio broadcasts, the scanner receiver squelch circuitry controls the scan-and-receive aspect of the scanner operation, preventing the scanning sequence from stopping at an inactive channel. When scanning an Internet streaming audio source, an audio threshold test is made in the scanner 30, which qualifies whether or not there is presently active audio content in the intermittent audio content being streamed from the currently addressed URL. If not, the scanner 30 loads the next Internet address or radio frequency to continue the sequential scanning process. Alternatively, the user can activate a "hold" function in the device, which causes the continued monitoring of the current source regardless of whether there is active content or not. The ISRS, which is a network client in the illustrative embodiment, can receive one or more audio streams, which may be standard audio streams, or one of the variant types discussed above. In whatever protocol is used, the client discriminates between periods of silence and periods of activity in the audio stream sources. This information is used in a manner analogous to a squelch test in a conventional radio frequency scanner. The test for activity may be conducted with respect to the audio content in the streaming signal, or may be accomplished by reading embedded data that indicates whether a threshold condition for audio activity is presently being satisfied. The client can scan multiple streams, which may be audio streams or radio frequency channels, and select an active source using the squelch gate or threshold tests. In another embodiment, while the scanner is otherwise busy (for example, playing audio from one source), the scanner can buffer audio segments from other sources (potentially network and/or radio frequency sources) for later playback when the scanner output becomes available. Buffering is an alternative process to simplify reproducing the streaming audio content acoustically. This approach reduces communications loss due to timing collisions between activity on different sources. When more than one active audio source or segment is available, priority rules are employed for selecting the order of output, or for selecting the most valuable audio segment for output.

Notice that the Internet scanner 30 in FIG. 1 also includes a PTT microphone 34 coupled to enable vocal commentary into the local audio content. The computing device includes browser and streaming audio server software applications in addition to the aforementioned TCP/IP interface function. This configuration allows the ISRS 6 to also function as an Internet scanner feed station, providing the Boston Police Department 14 dispatch audio traffic back into the Internet for access by others on the Internet. This innovative architecture provides for rapid growth and consumption of Internet scanner feeds. In most of the embodiments contemplated hereunder, a feed station may also include a receiver station, and similarly, a client device may include a server function, and vice versa.

Figure 2B:
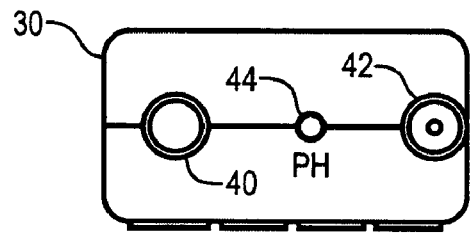
FIGS. 2A, 2B, and 2C are drawings of an Internet scanner according to an illustrative embodiment of the present invention.
Figure 2C:
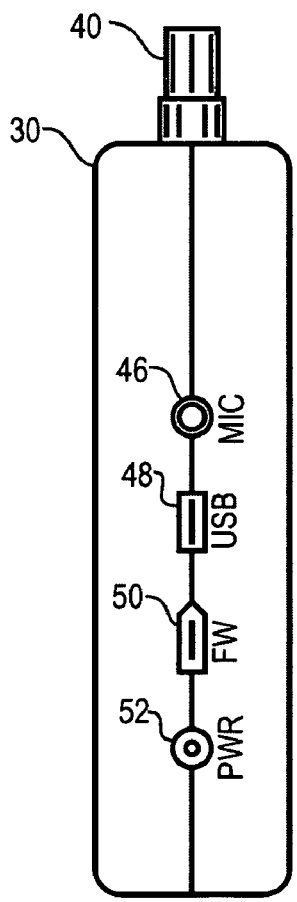
Figure 2A:
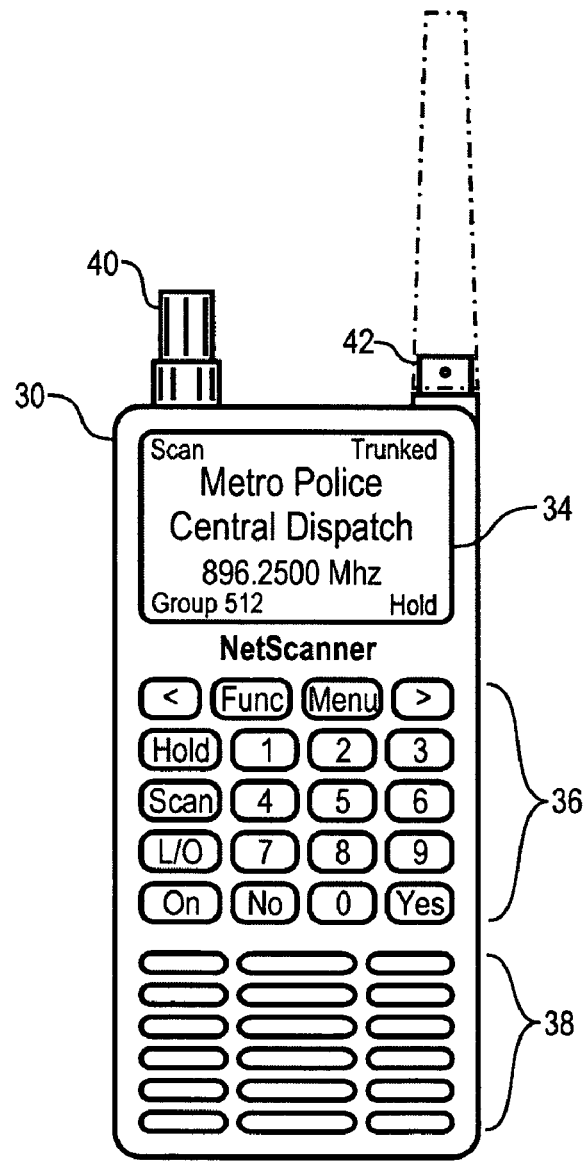

Reference is directed to FIGS. 2A, 2B, and 2C, which are front view, top view and side view drawings, respectively, of an Internet scanner 30 according to an illustrative embodiment of the present invention. The scanner 30 is configured in a fashion similar to the conventional radio scanner, which is preferred by scanning enthusiasts. A display 34 provides operational information including the current source for intermittent audio content, which may be radio channel information or Internet channel information, as well as certain control parameters, icons, and so forth. A keypad 36 is used for input of operation and control parameters. A loudspeaker 38 outputs acoustic signals of the presently received intermittent audio content as the scanner sequence through the scanned list of channels, including radio tuned channels and Internet URL addressed channels. A concentric knob set 40 presents squelch and volume controls on the top of the scanner 30. Note that the squelch threshold for radio signals operates in the manner known to those skilled in the art or radio scanners. The same control knob 40 adjusts and audio threshold detection level, which is used to discriminate the presence of active audio content in an intermittent audio content streaming audio signal. This threshold discrimination process may be accomplished in the analog or digital domains.

A headphone connector 44 is provided on top of the scanner 30 in FIG. 2B for private listening by the user. An antenna connector 42 is provided for connection of a short stick antenna directly on top of the scanner 30, or for connection of a cable to a remotely located antenna. On the side of the scanner 30 in FIG. 2C is a DC power connector 52, an IEEE 1394 ("Firewire") connector 50, a USB connector 48, and a microphone input connector 46. While the USB port is illustrated, other communication port interface standards known to those skilled in the art are equally applicable, such as the RS-232 standard. The power connector 52 enables the connection of an external power supply to power the scanner 30 or charge its internal storage battery. The Firewire 50 and USB 48 connectors facilitate the communications port connection to the external computing device, which provides a TCP/IP connection and certain software functionality for the ISRS system. Either or both of the communications port interfaces 48, 50 may be employed, depending on the illustrative embodiment. In some illustrative embodiments, an RJ-45 Ethernet compliant port is provided, and, the scanner can be directly coupled through an Ethernet modem or router, obviating the need for an external computing device. This concept will be more fully discussed hereinafter.

Figure 3:
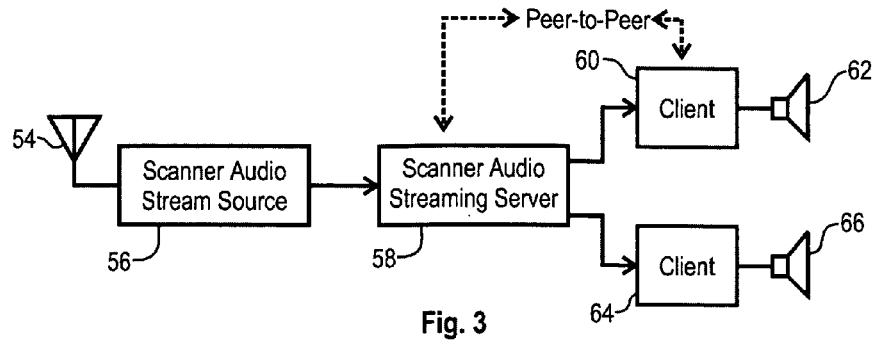
FIG. 3 is a functional block diagram of an Internet scanner server coupled to Internet scanner clients according to an illustrative embodiment of the present invention.

Reference is directed to FIG. 3, which is a functional block diagram of an Internet scanner server coupled to Internet scanner clients according to an illustrative embodiment of the present invention. FIG. 3 illustrates one of several communication coupling configurations. A peer-to-peer network connection is established between a streaming audio server 58, which receivers scanning radio audio from an audio stream source 56, to one or more client terminals 60, 64. The client terminals output the audio to loudspeakers 62, 66, respectively. The salient arrangement is that the streaming audio server 58 is addressed by a client 60, and the network connection is a peer-to-peer connection. The server 58 may have sufficient bandwidth to the network to support plural peer-to-peer connections. This structure enables radio signals received through an antenna 54 by a scanner audio stream source 56, such as a scanning radio receiver, to be streamed into a network by a scanning audio streaming server 58, and received by one or more clients 62, 66, which are ISRS of the present invention. In the case where each client 62, 66 monitors plural streaming servers (not shown), then the client sequentially addresses each server, looking for active audio signals in the intermittent audio streams. Thus, each client is programmed with a list of network addresses for the list of streaming servers that are to be scanned.

Figure 4:
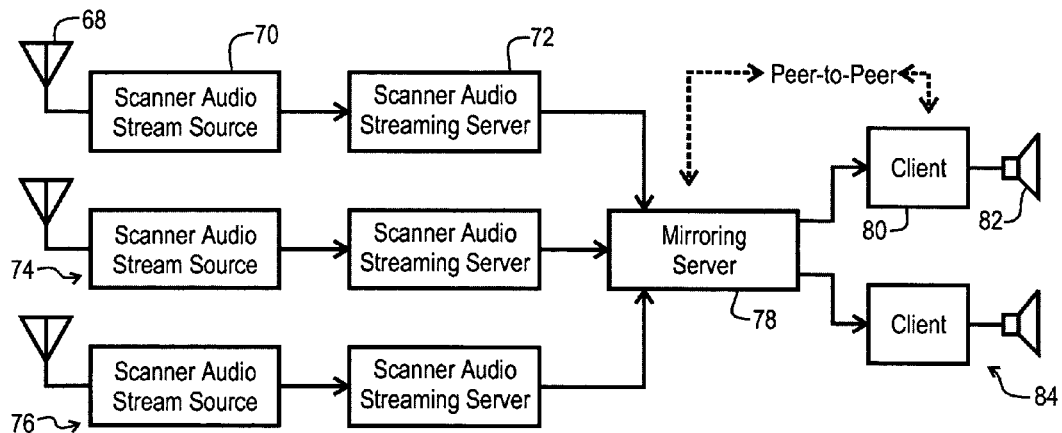
FIG. 4 is a functional block diagram of plural Internet scanner servers coupled to plural Internet scanner clients through a mirroring server according to an illustrative embodiment of the present invention.

Reference is directed to FIG. 4, which is a functional block diagram of plural Internet scanner servers coupled to plural Internet scanner clients through a mirroring server according to an illustrative embodiment of the present invention. The embodiment of FIG. 4 couples a first network streaming audio source, which includes an antenna 68, a scanner audio stream source 70, and a scanner audio streaming server 72, to a mirroring server 78, together with other network streaming audio sources 74, 76 such that the streaming audio sources are consolidated at the mirroring server 78. The mirroring server has the needed bandwidth to support plural clients, and offers the convenience of locating plural audio feeds at a single network address. Each client consists of an ISRS 80 with a loudspeaker output 82 in the illustrative embodiment. The second ISRS is also coupled to the mirroring server 78. The peer-to-peer network connection is between each client and the mirroring server 78. This arrangement serves the streaming audio to the clients, and the audio signal threshold discrimination process can be accomplished either in the mirroring server 78 of the clients. Scanning of plural network sources is accomplished without sequential addressing within the network.

Figure 5:
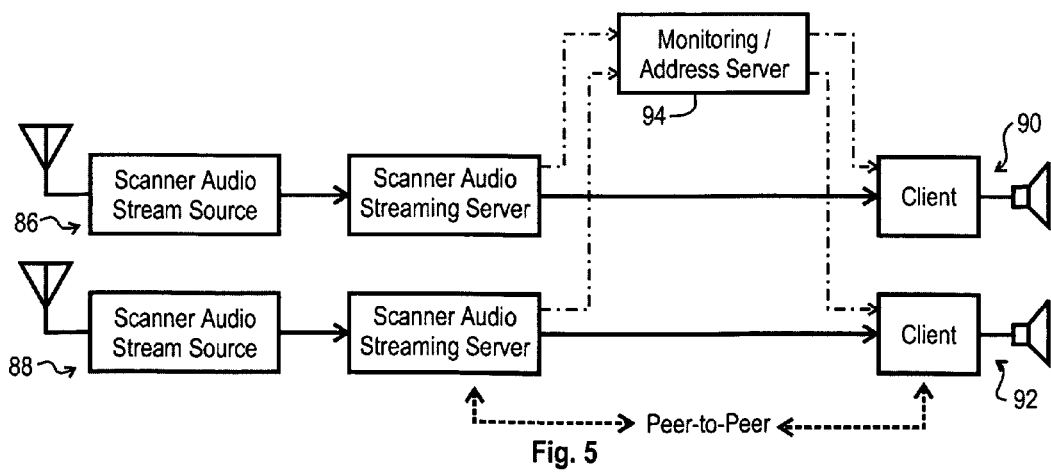
FIG. 5 is a functional block diagram of plural Internet scanner servers coupled to plural Internet scanner clients employing an address server according to an illustrative embodiment of the present invention.

Reference is directed to FIG. 5, which is a functional block diagram of plural Internet scanner servers coupled to plural Internet scanner clients employing an address server according to an illustrative embodiment of the present invention. Plural network streaming audio sources 86, 88 provide streaming audio feeds to the network, which are addressed through each feed's 86, 88 network address. A peer-to-peer connection may be established between any of plural clients 90, 92 and any of the plural servers 86, 88. However, the issue of locating desirable network addresses for the plural servers is simplified through the use of a monitoring and address server 94. The address server tracks available scanner feed sources and maintains a list of addresses and other pertinent information about them. Each client 90, 92 can access the address server to obtain a list of addresses and other pertinent information, and then use this information for establishing a directed peer-to-peer network connection with the plural servers 86, 88. During actual scanning and threshold detection, the clients 90, 92 sequentially address the servers 86, 88 from the list previously obtained from the address server 94.

Figure 6:
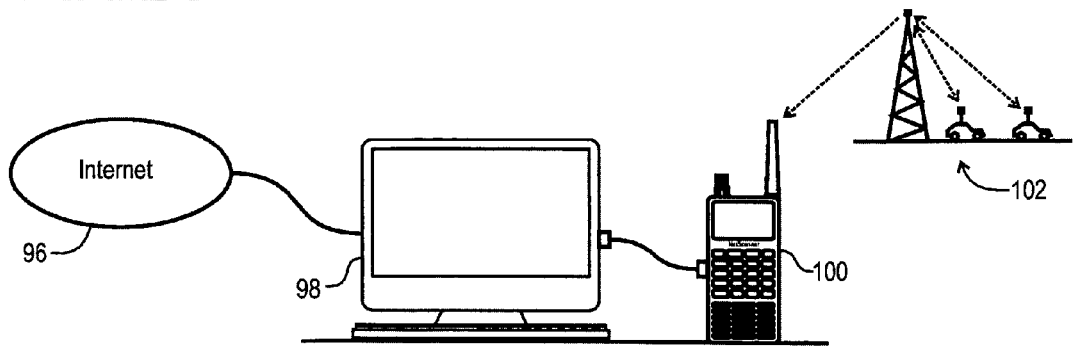
FIG. 6 is a drawing of an Internet scanner coupled to the Internet through a personal computer according to an illustrative embodiment of the present invention.

Reference is directed to FIG. 6, which is a drawing of an Internet scanner 100 coupled to the Internet 96 through a personal computer 98 according to an illustrative embodiment of the present invention. The Internet audio scanner 100 is configured to include both a conventional radio scanner circuit that enables scanning of local radio dispatch systems 102, and an Internet streaming audio scanning circuit with communications interface to a personal computer 98. The personal computer provides the TCP/IP connection to the Internet 96 in any manner that is known to those skilled in the art. The communications port coupling transfers control commands, embedded data, and streaming audio signals between the scanner 100 and computer 98. Software applications are distributed between the computer 98 and the scanner 100. In the illustrative embodiment, a web browser application and audio player application, with CODEC, execute on the computer 98. The audio signal threshold detection and address selection functions are embodied in the scanner 100. In operation, the scanner 100 sequentially provides Internet addresses to the computer, which addresses the requested network sites, and then provides the resultant streaming audio to the scanner 100 through a USB port. The scanner 100 threshold checks the signal. If active audio content if found, the audio is reproduced over the loudspeaker. If active content is not found, or if the active content ceases, then the scanner sequentially selects the next channel and proceeds. The next sequential channel may be another network address or a radio scanner channel with corresponding radio frequency and squelch codes or talk group data.

Figure 7:
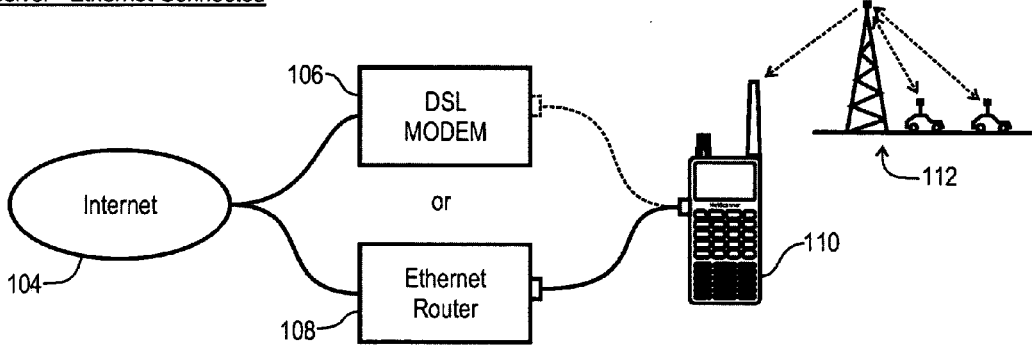
FIG. 7 is a drawing of an Internet scanner coupled to the Internet through a modem or router according to an illustrative embodiment of the present invention.

Reference is directed to FIG. 7, which is a drawing of an Internet scanner 110 coupled to the Internet 104 through a modem 106 or router 108 according to an illustrative embodiment of the present invention. In these embodiments, the TCP/IP connection is provided by the DSL modem 106 or an Ethernet router 108, or other network interface. Again, the Internet audio scanner 110 is configured to include both a conventional radio scanner circuit that enables scanning of local radio dispatch systems 112, and an Internet streaming audio scanning circuit with an Ethernet port for interface to the modem 106 or router 108. A processor in the scanner 110 runs a variety of software applications including a web browser application and audio player application, with CODEC. TCP/IP streaming audio packets are received directly into the scanner 110 through the Ethernet interface. The audio signal threshold detection and address selection functions are embodied in the scanner 110 as well. In operation, the scanner 100 sequentially provides Internet addresses to the modem 106 or port 108. The resultant streaming audio is returned to the scanner 110. The scanner 110 either threshold checks the streaming audio signal, or processes an embedded data field for threshold condition information. If active audio content if found, the audio is reproduced over the loudspeaker. If active content is not found, or if the active content ceases, then the scanner sequentially selects the next channel and proceeds. The next sequential channel may be another network address or a radio scanner channel with corresponding radio frequency and squelch codes or talk ground data.

Figure 8:
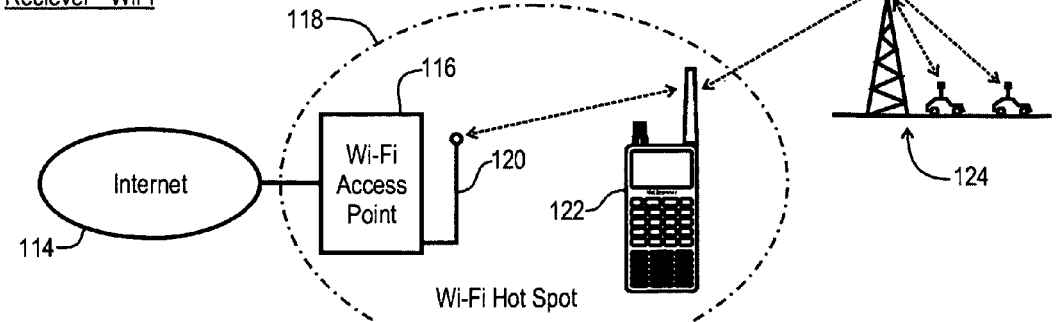
FIG. 8 is a drawing of an Internet scanner coupled to the Internet through a Wi-Fi hot spot according to an illustrative embodiment of the present invention.

Reference is directed to FIG. 8, which is a drawing of an Internet scanner 122 coupled to the Internet 114 through a Wi-Fi hot spot 118 according to an illustrative embodiment of the present invention. In this embodiment, true portability of an integrated radio scanner and Internet scanner is realized. The radio scanner can receive and scan local dispatch radio systems 124 in the similar fashion of prior art radio scanners. In addition, the scanner 122 includes a Wi-Fi complaint transceiver for access to a wireless Internet presence. Such presences, typically complaint with the IEEE §802.11(et. seq.) standards, are becoming more and more common as a source of TCP/IP interface to the Internet. Thus, a Wi-Fi access point 116 broadcasts 120 a broadband local area network radio signals to form the Wi-Fi hot spot 118. When the scanner 122 moves into radio range of the hot spot 118, it registers and a high speed TCP/IP connection to the network 114 becomes available. As in the previous two embodiments, the Internet audio scanner 122 is configure to include both a conventional radio scanner circuit that enables scanning of local radio dispatch systems 124, and an Internet streaming audio scanning circuit with a Wi-Fi transceiver accessing the hot spot 118. In addition to controlling the Wi-Fi transceiver, a processor in the scanner 122 runs a variety of software applications including a web browser application and audio player application, with CODEC. TCP/IP streaming audio packets are received through the Wi-Fi interface. The audio signal threshold detection and address selection functions are embodied in the scanner 122 as well. In operation, the scanner 122 sequentially provides Internet addresses to Wi-Fi interface. The resultant streaming audio is returned to the scanner 122 through the hot spot 118. The scanner 122 threshold checks the streaming audio signal, or reads an embedded data field for a threshold condition indication. If active audio content if found, the audio is reproduced over the loudspeaker. If active content is not found, or if the active content ceases, then the scanner sequentially selects the next channel and proceeds. The next sequential channel may be another network address or a radio scanner channel with corresponding radio frequency and squelch codes or talk group data. Those skilled in the art will appreciate that any wireless network interface presently known, such as wireless, cellular, Bluetooth, or that may later become known could be substituted for the Wi-Fi interface discussed above.

Figure 9:
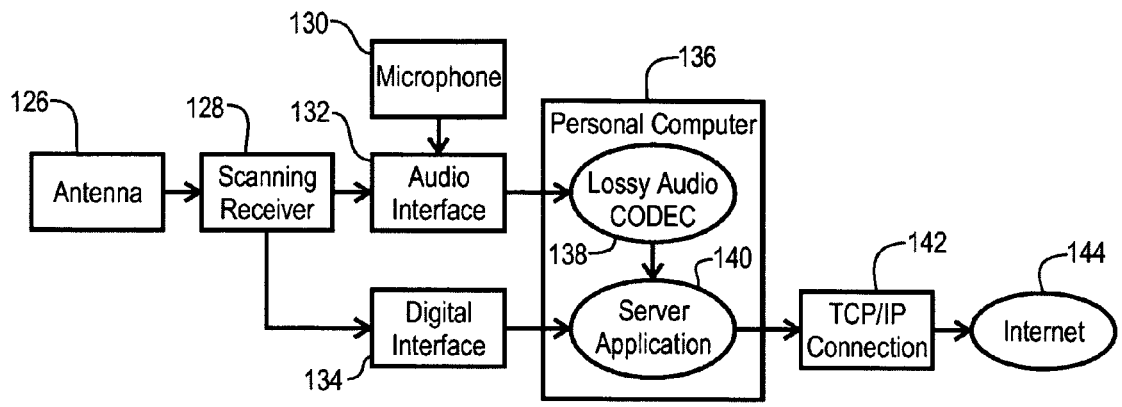
FIG. 9 is a functional block diagram of an Internet scanner feed station according to an illustrative embodiment of the present invention.

Reference is directed to FIG. 9, which is a functional block diagram of an Internet scanner feed station ("ISFS") according to an illustrative embodiment of the present invention. The ISFS is employed to scan local radio broadcast systems that transmit intermittent audio content signals, and couple these signals into the Internet 144 as streaming audio signals with intermittent audio content. The intermittent nature of the audio signals exists due to the nature of two-way radio and dispatch radio communications traffic. An antenna 126 is used to receive the broadcast signals. A scanning radio receiver 128, which is one of the many varieties known to those skilled in the art, scans one or more frequencies, squelch codes, or talk group identities in search of audio signals. The received audio signals are coupled to an audio interface 132 that converts the analog audio signals to digital audio signals and couples these into a personal computer 136. The audio interface 132 is typically a personal computer sound card, however other interfaces known to those skilled in the art can be used. The digitized audio is coupled to a lossy audio codec 138 application the runs in the personal computer. One such lossy codec application is Simplecast™ provided by Spatial Audio Solutions, LLC in Ropesville, Tex. Other lossy CODEC applications are available, as will be appreciated by those skilled in the art. The compressed audio stream output from the lossy CODEC 138 is coupled to a network server application 140. In an illustrative embodiment, the Icecast Server™ from The Xiph Open Source Community at www.xiph.org is used. The server application 140 couples the TCP/IP streaming audio content into the Internet 144 via a suitable TCP/IP connection 142, such as a DSL modem, etc.

Various scanning radio receivers can be employed as the scanning receiver 128 in FIG. 9. Those skilled in the art will appreciate that certain models provide a digital interface output that provides information about the presently received channel and also access for control and programming of the radio receiver. An embodiment of the present invention advantageously utilizes this option by including a digital interface 134 between the scanning receiver 128 and the personal computer 136. A USB interface is suitable for this connection. The digital interface 134 couples data from the scanner 128 to the server application, which sends the information along with the streaming audio into the Internet as embedded data that corresponds to the present streaming audio signal. The embedded data can include the frequency of reception, a description of the service being received, and an indication of the audio activity presently being streamed. The digital information may include "alpha tags" and can be displayed by the ISRS on a display. The content of alpha tags varies, and can include the source city, server and channel information for the current audio stream. The ISFS of FIG. 9 also illustrates the local microphone 130 interface to the sound card 132. This connection allows the operator of the ISFS to vocally annotate the streaming audio with additional audio information.

Figure 10:
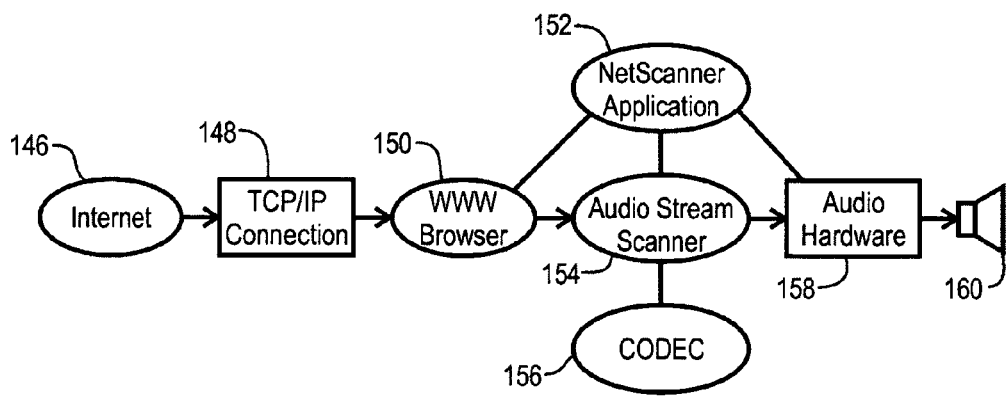
FIG. 10 is a functional block diagram of an Internet scanner receiver station according to an illustrative embodiment of the present invention.

Reference is directed to FIG. 10, which is a functional block diagram of an Internet scanner receiver station ("ISRS") according to an illustrative embodiment of the present invention. The ISRS sequentially receives streaming audio signals containing intermittent audio content and embedded data, processing the content if it meets a threshold level. The threshold level can be determined by analyzing the audio content or interpreting the embedded data. The term "processing" encompasses a range of functions within the scope of the present invention, in FIG. 10, "processing" means converting the signals to analog signals and acoustically reproducing them over a loudspeaker 160. In FIG. 10, streaming audio signals arrive from the Internet 146 through a TCP/IP interface 148, such as a DSL modem, Wi-Fi hot spot, Ethernet, or other connection. The addressing and management of the TCP/IP connection is handled by a Web browser application, or other suitable application, as are known to those skilled in the art. Within the ISRS as several hardware and software processes and applications. They are all overseen by a NetScanner application 152, which manages the operation of the ISRS. This includes managing the sequential scan address list. An audio stream scanner application monitors the streaming audio packets by reading the embedded data or checking the threshold level of detection of active signals in the intermittent content audio. A CODEC 156 is employed to decode the lossy CODEC encoded stream of packets. The decoded audio stream may be coupled to an audio hardware output circuit that ultimately drives a loudspeaker in the illustrative embodiment. Since ISFS may encode audio streams in a variety of different formats, including MPEG, Windows Media Player, Real Audio Player, iTunes, WinAmp, and others, the CODEC 156 (or CODECs) must be compliant with whatever compression format is utilized. Note that the various applications and functions within the ISRS can be split into plural physical devices. These can include the TCP/IP connection modem, router, or wireless hub, a personal computing device, a radio scanner, a fixed or portable terminal device and so forth, as discussed elsewhere herein or appreciated as applicable by those skilled in the art.

Reference is directed to FIG. 11, which is an audio waveform 162 illustrating a prior art Internet radio station signal. The present invention is able to scan one or more streaming audio signals that contain intermittent audio content. FIG. 11 illustrates a waveform from a typical Internet audio source where continuous streams of content are transmitted. In FIG. 11, a typical Internet radio station signal is illustrated. As in commercial broadcast radio, the goal is to keep the content flowing, thereby holding the interest of listeners. Where there are breaks 164, 166 in the continuous flow of audio, they are kept as short as possible. Receivers address these kinds of servers and monitor the streaming audio on a continuous basis. Now consider FIG. 12, where the nature of intermittent audio content is illustrated.

Reference is directed to FIG. 12, which is an audio waveform and Internet scanner threshold detection gate-timing diagram according to an illustrative embodiment of the present invention. With scanning receiver signals and with streaming audio thereof, the audio content is intermittent in nature, as is illustrated by waveform 168. There are periods of quiet, where no signal is present, periods of strong signal levels where meaningful communication occurs, and periods of weak signals and noise such as background sounds, etc. The present invention discriminates meaningful signals using an adjustable threshold 176, which is set to a predetermined level, and which may change from time to time. The change may be accomplished manually by a user or automatically by programmed routine. When the signal level meets the threshold level, then active audio content is discriminated. Bar graph 170 in FIG. 12 shows the time periods of active signal 172 versus inactive signal 174. When the signal meets the threshold, the signal becomes active. As time passes 178, it can be appreciated that a significant amount of that time 178 is inactive with respect to signal activity.

The present invention utilizes the inactive signal periods 174 to take action and seek other active content from other streaming audio or scanning receiver sources by sequentially loading the next address (or channel) and repeating the threshold (or squelch) determination test. Threshold gate activity is plotted as a timing diagram 180 in FIG. 12, which is superimposed in time 178 with the audio waveform 168. Note that when the signal 168 goes active the threshold (or squelch) gate opens 190, enabling the subsequent processing of the received audio stream. When the signal 168 goes inactive, the threshold gate closes 189, enabling the subsequent scanning 186 of the next sequential audio stream resource. However, strict adherence to the threshold gate closing process results in scanning that might occur too quickly, catching very brief pauses and short reply-communication response times. To alleviate this issue, a programmable hold time 188 is added to delay the threshold gate closing so as to capture as much meaningful communication as possible. The duration of the hold interval 188 can be set manually or automatically.

Figure 13:
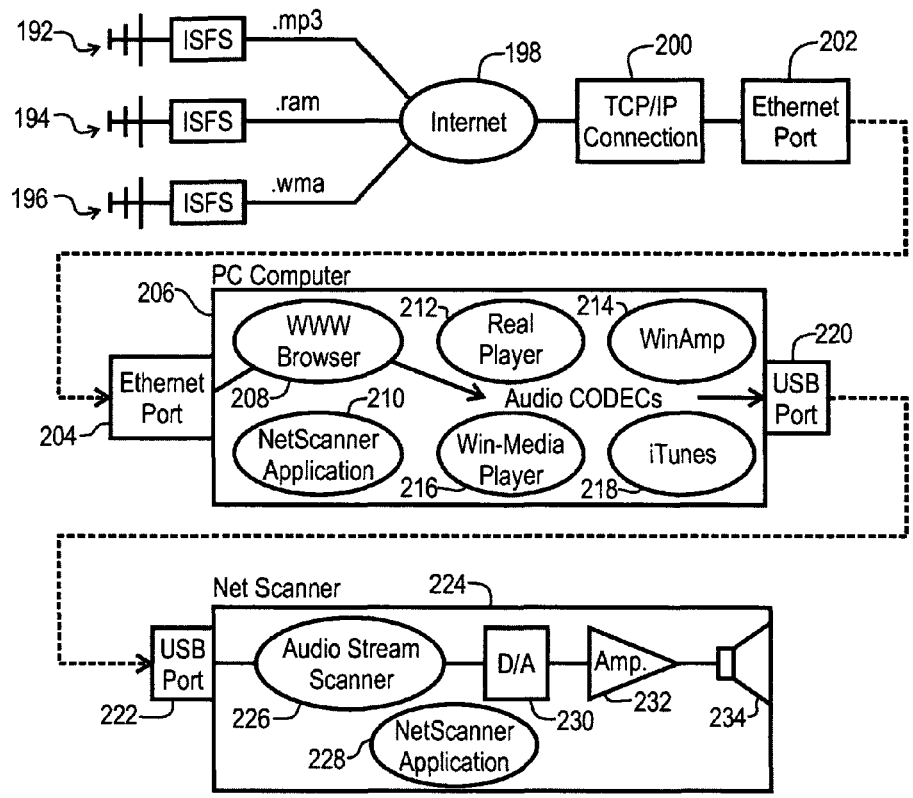
FIG. 13 is a functional block diagram of an Internet scanner coupled to the Internet through a personal computer according to an illustrative embodiment of the present invention.

Reference is directed to FIG. 13, which is a functional block diagram of an Internet scanner 224 coupled to the Internet 198 through a personal computer 206 according to an illustrative embodiment of the present invention. In this illustrative embodiment, the personal computer 206 is used as a host to the Internet scanner 224, and provides the TCP/IP connection, and runs certain software applications. In FIG. 13, there are plural ISFS 192, 194, 196 that couple intermittent content audio streams from scanning radios located somewhere in the Internet 198. Note that the plural ISFS do not necessarily use a common lossy CODEC streaming audio file format. In the illustrative embodiment, the first ISFS 192 uses the ".mp3" file extension indicating MPEG compliance. The second ISFS 194 uses the Real Audio ".ram" file format. The third ISFS 196 uses the Microsoft Windows Media Payer ".wma" file format. Each of these servers is accessed by addressing its respective Internet IP address. The personal computer 206 is coupled through its Ethernet port 204 to the Ethernet port 202 on a TCP/IP interface 200, such as a DSL modem, which provides the Internet access.

In FIG. 13, the personal computer 206 runs an Internet browser application 208, which provides the hypertext, addressing, and HTML interface to the TCP/IP connection 200. A Net Scanner application 210 also runs on the computer 206, and provides the management of the interface processes within the computer 206. Plural media players may be employed, each including a corresponding CODEC application, to receive and decode the streaming audio IP packets, which are then output to a USB port 220 on the computer. In the illustrative embodiment, the plural media players include Real Player (.ram files) 212, Windows Media Player (.wma files) 216, WinAmp (.wma & .mp3 files) 214, and iTunes (.mp3 files) 218. The NetScanner application 210 directs the appropriate routing of the IP packets to the correct player, and also directs the browser application 208 addressing and data routing processes. Control commands and streaming audio are routed to the Internet scanner 224 through a USB port 220 on the computer 206.

The Internet scanner 224 in FIG. 13 transmits and receives control commands and streaming audio through its USB port 222. A Net Scanner application 228 manages the communication and operational processes in the Internet scanner 224. An audio stream scanner application 226 processes the streaming audio, including intermittent audio content and threshold detection within the Internet scanner 224. Threshold detection is communicated to the Net Scanner application, 228, which sequences through the list of Internet addresses searching for active audio content. When active content is discriminated by the audio stream application 226, the Net Scanner application ceases the scanning process and routes the active content packets to a digital to analog converter 230. The analog signals are output to an amplifier 232 and loudspeaker 234 for acoustic reproduction. Note that acoustic reproduction is just one form of processing that can occur as a result of detection of active audio content. Other processes include storing the audio for later reproduction and forwarding the audio content to another device or application, which may be local or located on the network.

Figure 14:
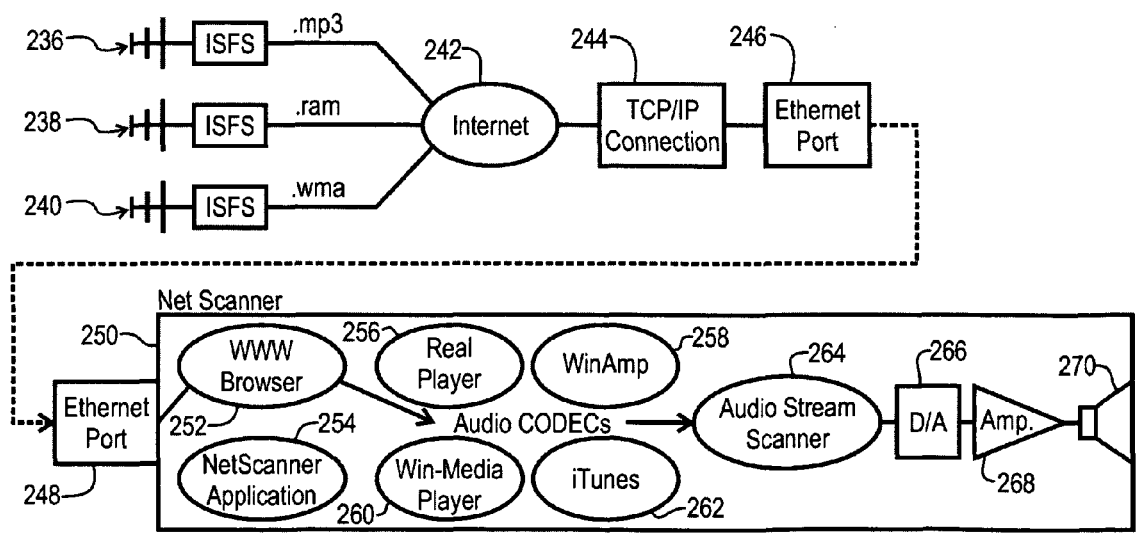
FIG. 14 is a functional block diagram of an Internet scanner coupled to the Internet through an Ethernet port according to an illustrative embodiment of the present invention.

Reference is directed to FIG. 14, which is a functional block diagram of an Internet scanner 250 coupled to the Internet 242 through an Ethernet port according to an illustrative embodiment of the present invention. In this illustrative embodiment, the Internet scanner 250 is a stand-alone device that does not require a personal computer for Internet access. In FIG. 14, there are plural ISFS 236, 238, 240 that couple intermittent content audio streams from scanning radios located somewhere in the Internet 242. Note that the plural ISFS do not necessarily use a common lossy CODEC streaming audio file format. In the illustrative embodiment, the first ISFS 236 uses the ".mp3" file extension indicating MPEG compliance. The second ISFS 238 uses the Real Audio ".ram" file format. The third ISFS 240 uses the Microsoft Windows Media Payer ".wma" file format. Each of these servers is accessed by addressing its respective Internet IP address.

In FIG. 14, a processor in the Internet scanner 250 runs an Internet browser application 252, which provides the hypertext, addressing, and HTML interface to the TCP/IP connection 244 via the two device's Ethernet ports 246, 248. A Net Scanner application 254 also runs on the processor, and provides the management of the interface processes within the TCP/IP connection 244. Plural media players may be employed, each including a corresponding CODEC application, to receive and decode the streaming audio IP packets, which are then output to an audio stream scanner application 264 in the Internet scanner 250. In the illustrative embodiment, the plural media players include Real Player (.ram files) 256, Windows Media Player (.wma files) 260, WinAmp (.wma & .mp3 files) 258, and iTunes (.mp3 files) 262. The NetScanner application 254 also directs the appropriate routing of the IP packets to the correct player, and also directs the browser application 252 addressing and data routing processes.

Within the Internet scanner 250 in FIG. 14, the Net Scanner application 254 manages the various communication and operational processes in the Internet scanner 250. An audio stream scanner application 264 processes the streaming audio, including intermittent audio content and threshold detection within the Internet scanner 250. Threshold detection is communicated to the Net Scanner application 254, which sequences through the list of Internet addresses searching for active audio content. When active content is discriminated by the audio stream application 264, the Net Scanner application 254 ceases the scanning process and routes the active content packets to a digital to analog converter 266. The analog signals are output to an amplifier 268 and loudspeaker 270 for acoustic reproduction. Note that acoustic reproduction is just one form of processing that can occur as a result of detection of active audio content. Other processes include storing the audio for later reproduction and forwarding the audio content to another device or application, which may be local or located on the network.

Figure 15:
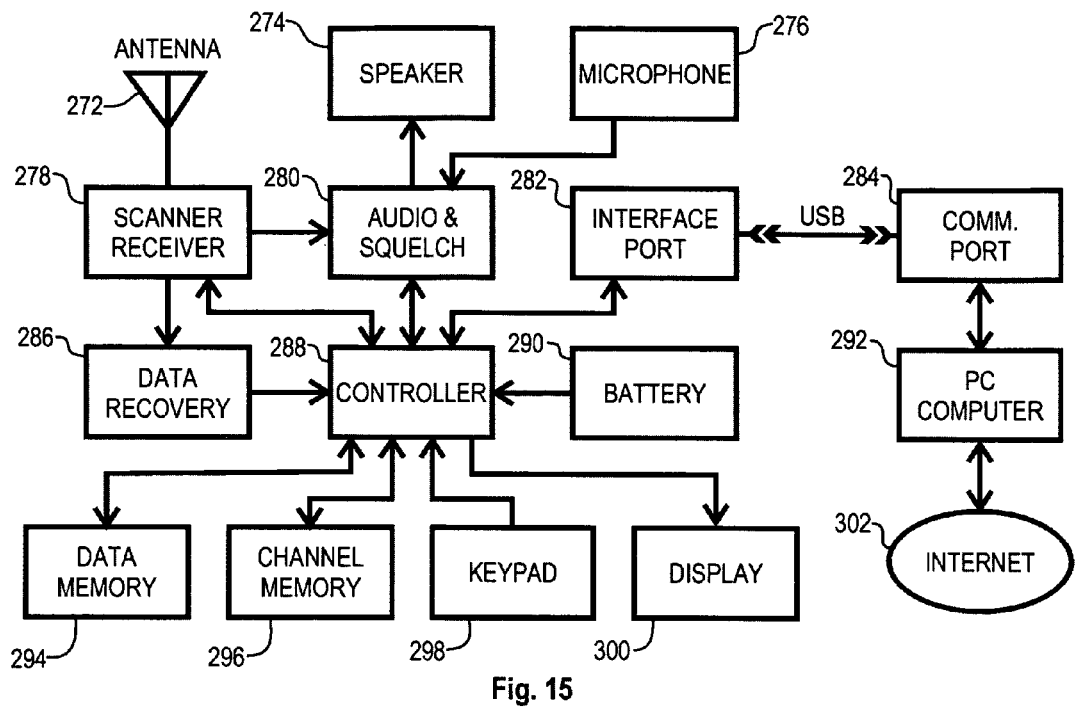
FIG. 15 is a functional block diagram of an Internet scanner coupled to the Internet through a personal computer according to an illustrative embodiment of the present invention.

Reference is directed to FIG. 15, which is a functional block diagram of an Internet scanner coupled to the Internet through a personal computer according to an illustrative embodiment of the present invention. The personal computer 292 may be coupled to the Internet 302 in any manner known to those skilled in the art. The personal computer further includes a USB communications port 284 for coupling to a corresponding interface port 282 in the Internet scanner. While the USB standard communication protocol is used in the illustrative embodiment, any other communications interface known to those skilled in the art could be employed. The Internet scanner utilizes a microcontroller 288 as a central processor to control the operation and embody the software functionality of the device. The scanner of FIG. 15 also includes a radio scanner receiver 278 with corresponding antenna 272. In the case where radio signals employing coded squelch tones, digital squelch codes, digital control channels, or talk group identities are monitored, a data recovery circuit 286 is provided that decodes this information and couples it to the processor 288. In the case where carrier squelch control is employed, an audio and squelch circuit 280 is provided to discriminate active signals from noise, etc. The audio and squelch circuit 280 also filters and amplifies the received audio to drive a loudspeaker 274. The radio scanner functionality is embodied as software running on the processor 288. A channel memory 296 is coupled to the processor 288 and stores a list of frequencies, squelch codes, talk group identities, and so forth required for radio scanner operation.

The Internet scanner functionality is principally embodied in the software applications that run on the processor 288. A data memory 324 is provided for storing a list of network address, which are sequentially addressed and monitored for active audio content in the received streaming audio. The received streaming audio enters the Internet scanner though the interface port 282, where it is coupled to the controller to be decoded by a software CODEC and threshold tested for active audio content. If active content is identified, then the decoded stream is coupled to the audio circuit 280, which includes a digital to analog converter for driving an amplifier to the loudspeaker 274. A storage battery 290 provides power to the Internet scanner device. A keypad 298 is coupled to the processor for entry of various operation parameters and commands through keypad actuation. In addition, operation control and command can be entered through the user interface of the computer 292, and transferred through the communications ports 284, 282. A display 300 is coupled to the processor 288 for display of the operational parameters and display of the alpha tags of audio content that includes this feature.

Figure 16:
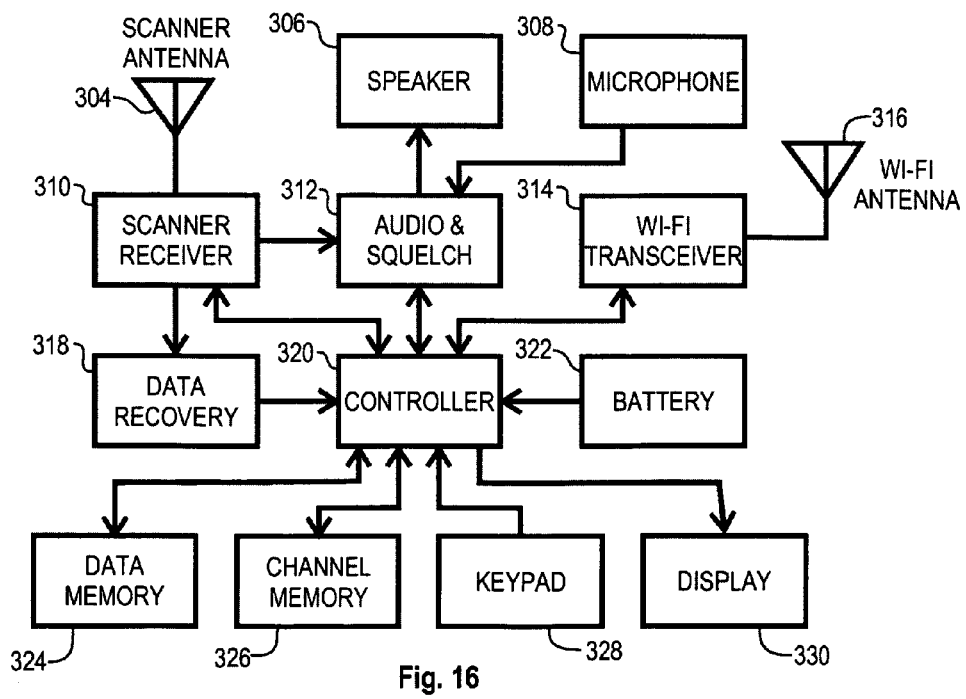
FIG. 16 is a functional block diagram of an Internet scanner according to an illustrative embodiment of the present invention.

Reference is directed to FIG. 16, which is a functional block diagram of an Internet scanner according to an illustrative embodiment of the present invention. The Internet scanner of this illustrative embodiment is coupled to the Internet (not shown) through a Wi-Fi hot spot (not shown) using a Wi-Fi complaint transceiver 314 and corresponding antenna 316. The Wi-Fi transceiver thereby provides a portable and wireless TCP/IP interface to the Internet. The Wi-Fi transceiver 314 is coupled to a microcontroller 320, which acts as the central processor to control the operation and embody the software functionality of the device. The scanner of FIG. 16 also includes a convention radio scanner receiver 310 with corresponding antenna 304. In the case where radio signals employing coded squelch tones, digital squelch codes, digital control channels, or talk group identities are monitored, a data recovery circuit 318 is provided that decodes this information and couples it to the processor 320. In the case where carrier squelch control is employed, an audio and squelch circuit 312 is provided to discriminate active signals from noise, etc. The audio and squelch circuit 312 also filters and amplifies the received audio to drive a loudspeaker 306. The radio scanner functionality is embodied as software running on the processor 320. A channel memory 326 is coupled to the processor 320 and stores a list of frequencies, squelch codes, talk group identities, and so forth required for radio scanner operation.

The Internet scanner functionality in FIG. 16 is principally embodied in the software applications that run on the processor 320. A data memory 324 is provided for storing a list of network address, which are sequentially addressed and monitored for active audio content in the received streaming audio. The received streaming audio enters the Internet scanner though the Wi-Fi transceiver 314, where it is coupled to the controller 320 to be decoded by a software CODEC and threshold tested for active audio content. If active content is identified, then the decoded stream is coupled to the audio circuit 312, which includes a digital to analog converter for driving an amplifier to the loudspeaker 306. A storage battery 322 provides power to the Internet scanner device. A keypad 328 is coupled to the processor 320 for entry of various operation parameters and commands through keypad actuation. In addition, operation control and command can be entered through the Wi-Fi transceiver 314 from a remote location on the Internet. A display 330 is coupled to the processor 320 for display of the operational parameters and display of the alpha tags of audio content that includes this feature.

Figure 17:
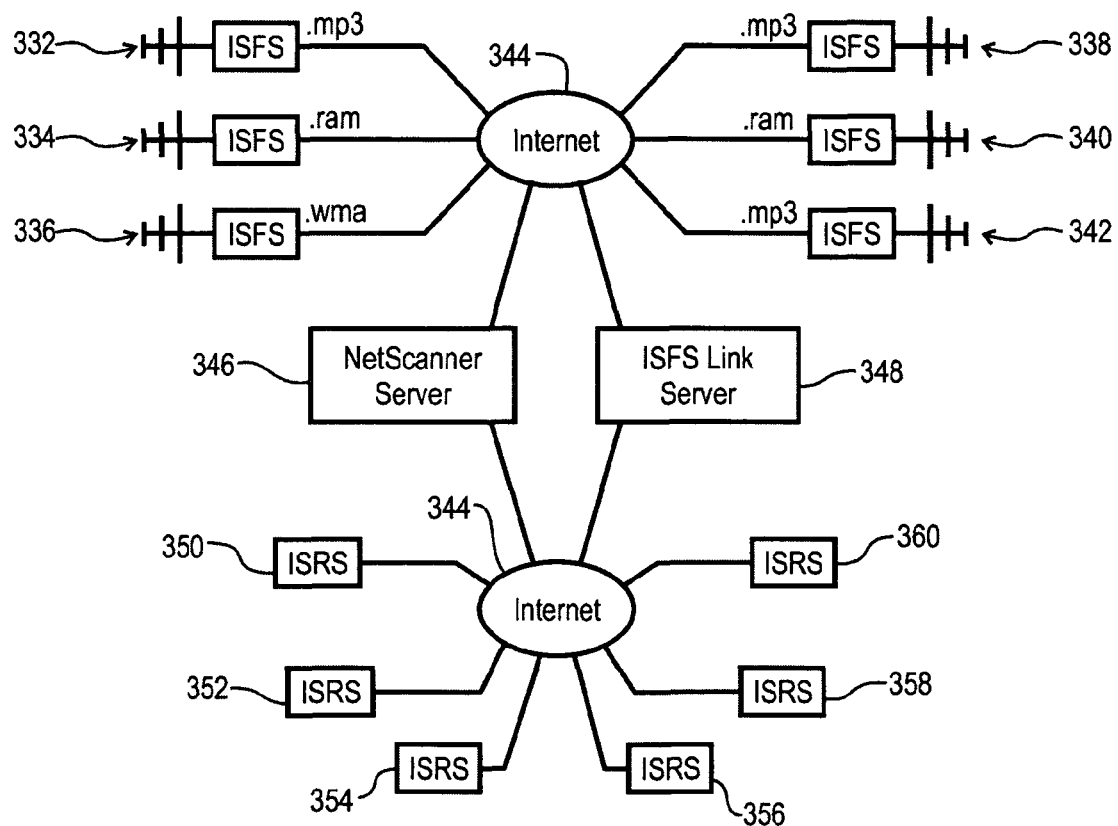
FIG. 17 is a network diagram according to an illustrative embodiment of the present invention.

Reference is directed to FIG. 17, which is a network diagram according to an illustrative embodiment of the present invention. In the illustrative embodiment, the Internet 344 serves as the host environment for the Internet scanner functionality. It will be appreciated by those skilled in the art that the teachings of the present invention are also applicable to other public and private networks, as the network merely serves as a host to the underlying features and functionality of the present invention. In FIG. 17 there are several Internet scanner feeds stations ("ISFS") 332, 334, 336, 338, 340, and 342 that are geographically distributed across the Internet 344. Since many of the ISFS are operated by individuals or independent groups, each is able to select their preferred encoding format for the production and distribution of streaming audio content they provide. As noted herein before, these include, but are not limited to MPEG encoded, Real Audio encoded, Windows Media Player encoded and other streaming formats. In order for these disparate formats to be received and reproduced, the receiving terminal device must either have the corresponding decoder or there must be some translation of the streaming audio to a format supported by the receiving terminal. In FIG. 17, the receiving terminals are illustrated as Internet scanner receiving stations ("ISRS") 350, 352, 354, 356, 358, and 360, that are also geographically distributed about the Internet 344. In addition to the issue of conforming the ISFS and ISRS coding formats, there is also the issue of locating ISFS addresses by the ISRS. Note that the list of addresses, like the list of Internet domain names, is constantly increasing and changing. As such, this represents a challenge for users of ISRS to keep up with the best and most interesting ISFS. This challenge is alleviated through the user of NetScanner servers 346 and ISFS Link Servers 348 in the illustrative embodiment.

The ISFS Link Server 348 in FIG. 17 is a computer coupled to the Internet that is configured as a server that locates and maintains a list of ISFS addresses. It can operate to gather ISFS in a variety of ways, such as a web crawler continually searching for streaming audio feeds, as a published repository that solicits listings by the individual ISFS, or as a user group of forum application that invites participation by individuals that operate ISRS. In all of these configurations, the goals is to maintain a list of valid and current ISFS address so the individuals using ISRS can access the URL of the ISFS Link Server 348 and download a listing of useful ISFS addresses for later direct scanning. The ISFS Link Server 348 can also perform categorization functions to classify streaming audio sources according to user interests.

The NetScanner Server 346 in FIG. 17 provides a different function. It establishes peer-to-peer network connections with the plural ISFS and then mirrors their streaming audio content out to the several ISRS. The plural ISFS streams may be combined into a single stream that is fed to one or more of the ISRS. In the process of mirroring, the streaming data protocols can be adjusted to meet the needs of the ISRS. The NetScanner Server 346 can also act as a bandwidth expander that is able to support many more peer-to-peer connections with ISRS than each of the individual ISFS might be able to. In addition, the NetScanner server 346 is accessible through a single Internet address so that the individual ISRS don't have to sequentially address and receive. Rather, the sequential accessing process is accomplished by the NetScanner server 346. Note that in the case of a NetScanner server operation, the process that is executed after active audio content is identified is to forward the streaming audio content to one or more of the ISRS, rather than acoustically reproducing it, as an individual network scanner would. The NetScanner Server 346 can also store, buffer and compress the quiet intervals in the intermittent audio content, which are other forms of processing the information.

The NetScanner Server 346 may provide additional management functions for the plural ISFS source that it combines. Audio segments from multiple discrete audio sources may be bundled onto a single stream delivered over the network. This may happen, for example, when a scanner or server receiving multiple Internet audio sources and/or multiple radio broadcast or logical channels retransmits selected audio segments from these multiple sources onto a single outgoing network feed. Digital information identifying the audio source may be transmitted in conjunction with the audio stream, either encoded within the same network stream or sent separately in a companion data-only network stream. When such a multiple-source audio stream is received, the corresponding digital information identifying the presently streamed audio source may be used in the operation of a digital squelch system at the client. This creates a novel type of DCS employing source identification information added by an upstream relay, as distinguished from traditional DCS employing information such as subaudible tones broadcast from the original source.

When a client ISRS receives a multiple-source stream with corresponding source identification information operating a DCS, an Internet scanner receiving only a single audio stream may be configured to receive or ignore individual discrete sources (such as the Boston and Atlanta police departments) based on the corresponding source identification information. For the client, receiving multiple sources on a single audio stream and implementing DCS to select desired audio segments and exclude undesired audio segments from that stream has the advantage of eliminating the need to reconnect, or maintain connections, to multiple streams for the purpose of testing the squelch condition from each individual network source. In a simple configuration, a computer receiving only a single network stream may use this form of DCS to implement a virtual scanner, without either a second network audio source or local radio receiver. This form of DCS may also be implemented in conjunction with reception of multiple audio sources, including other network streams and/or radio receivers.

In another variation, a server provides a network stream conveying DCS information corresponding to intermittent audio available on other active network streams or in file clips at other network addresses, where the referenced audio sources may be cogenerated by this server or supplied by other servers and merely observed and described by this server. Such a stream may be considered a directory stream describing information presently available through the network, associating descriptions with network addresses. The client may receive such a directory stream, and when a DCS threshold condition is presently satisfied for an audio source identified in this directory stream, acquire the indicated corresponding audio source from the network.

Audio segments available over the network may be delayed relative to their original time of broadcast. For example, there may be upstream buffering prior to stream generation and network lag time in stream delivery, or referenced audio segments may be distributed on demand as file clips. When audio segments may not be real time, it can be advantageous to incorporate a timestamp in the source identification information, identifying the original time of broadcast, to support DCS logic using both channel source and broadcast time information to determine threshold conditions for selecting segments. This allows for user control over the extent to which delayed audio is played or ignored. If the client buffers audio segments locally before playback, timestamp information also lets the client reconstruct the correct sequence of audio segments that are received with different delays. Another advantage of timestamp information is that, if the same audio segment is available with different delays from multiple network streams or file clip sources evaluated by the DCS, the client can ensure that a specific segment is only selected once.

Figure 18:
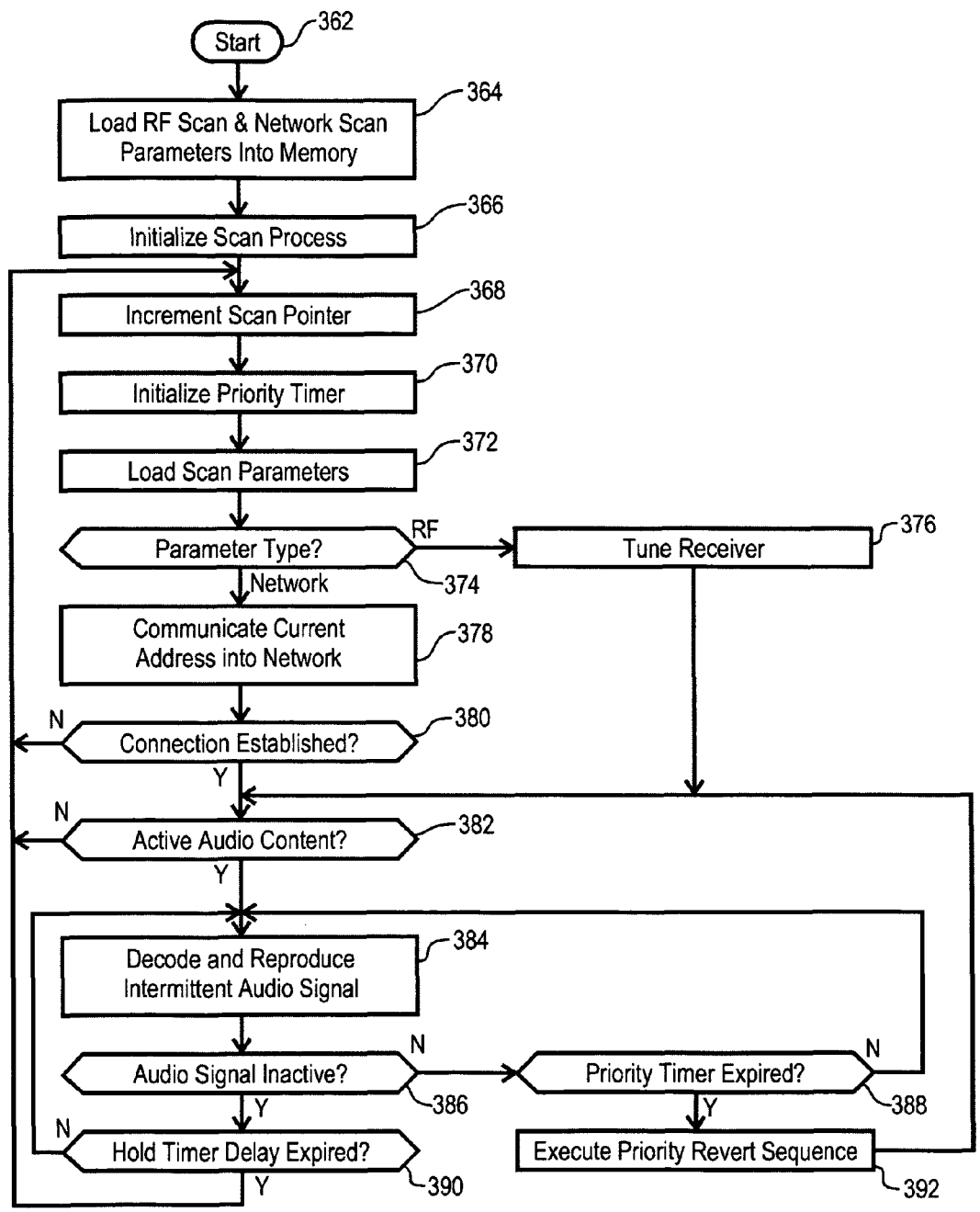
FIG. 18 is a process flow diagram according to an illustrative embodiment of the present invention.

Reference is directed to FIG. 18, which is a process flow diagram according to an illustrative embodiment of the present invention. The process involved is performed with a network scanner that includes a radio scanner circuit. The process begins at step 362 and proceeds to step 364 where the radio frequency scanning parameters and network scanning parameters are entered into memories in the scanner. At step 366, the scan process is initialized by the user, including a selection of which radio and network addresses are to be scanned, typically accomplished by creating a scan list. At step 368, a current address, or frequency, is selected by incrementing a scan pointer to a member of the scan list. The scan list may employ the use of alpha-numeric tags with familiar descriptive names, such as "Chicago Police Dispatch", to simply the user recollection of the contents of the list. In the scenario illustrated, one of the members of the scan list has a priority status, and at step 370 a priority timer is initialized, which will limit the time before the scan pointer reverts to the priority member of the list. At step 372, the scan parameters of the currently selected address, or radio frequency, are loaded from memory. At step 374, at test is made to determine if the current parameters are for a network address or a radio frequency. If a radio frequency has been loaded, then flow proceeds to step 376 where the receiver is tuned, and then to step 382 where a test looking for an active signal is done. Step 382 will be more fully discussed hereinafter. On the other hand, at step 374, if the current parameters are for a network address, then flow proceeds to step 378. At step 378, the current ISFS address is submitted to the network, and the process awaits confirmation of a network connection. At step 380 a test is conducted to determine of the connection has been established. If no connection is established, then flow returns to step 368 where the scan list pointer is incremented to the next member of the scan list. On the other hand, at step 380, if a connection has been established, then flow proceeds to step 382.

Once a radio frequency has been tuned at step 376, or a connection with a network streaming audio server has been established at step 380, then step 382 checks for the presence of active audio content in the received signal. In the case of a radio signal, the conventional squelch test is used. In the case of a network audio stream, the threshold test is used. If no active audio content is detected, then flow returns to step 368 where the scan pointer is incremented. On the other hand, at step 382, if active audio content is detected, then flow proceeds to step 384. Step 384 decodes and processes the received intermittent audio content signal, which means acoustic reproduction in the case of a user terminal device, such as a handheld scanner. Step 386 is a test to determine if the audio content has become inactive in the current signal. If the signal has gone inactive, then flow proceeds to step 390 where the hold timer runs to prevent premature scanning due to brief quiet periods in the intermittent audio signal. While the hold timer runs, flow returns to step 384 for continued decoding, etc. Once the hold timer expires at step 390, flow returns to step 368 where the scan pointer is incremented and scanning resumes. Now returning to step 386, if the audio signal has not gone inactive, then a brief priority test is commenced at step 388. This test checks the priority timer that was initialized at step 370, to determine if it is time to revert to the priority channel. If the priority timer has not expired at step 388, then flow returns to step 384 to continue the decoding process. On the other hand, at step 388, of the priority timer has expired, then flow continues to step 392. Step 392 is a priority revert sequence that cause the scanner to load and check the priority channel or address to check for active signal content. That test is processed in a similar manner to that discussed above. Once the priority revert process is complete, flow reverts to step 382 where the previous scan scenario is rechecked from active audio content.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A method of processing plural streaming audio signals communicated through the Internet, using an apparatus having access to the Internet, comprising the steps of:

selecting a first signal source, from amongst plural signal sources that each contain discrete communications events of intermittent audio content together with extended periods of silence, by selecting from a list of plural signal source network addresses stored in the apparatus by addressing an Internet server of streaming audio signals containing intermittent audio content located on the Internet according to the first signal source's Internet address;

processing said streaming audio signals received though the Internet from the first signal source for so long as a threshold condition indicating the presence of a discrete communications event is presently satisfied, and selecting a second signal source from the list of plural signal source network addresses if the threshold condition indicating the presence of a discrete communications event is not presently satisfied.

2. The method of claim 1 wherein said threshold condition is a threshold value of the intermittent audio content.

3. The method of claim 1, further comprising the steps of:
establishing an Internet connection to said second signal source, and
processing streaming audio signals received though the Internet from the second signal source if the threshold condition indicating the presence of a discrete communications event is presently satisfied.

4. The method of claim 1, wherein the apparatus includes a radio receiver, further comprising the steps of:
in response to the threshold condition indicating the presence of a discrete communications event is not presently satisfied, controlling the radio receiver to discriminate audio signals from radio signals, and
processing said audio signals if the intermittent audio content therein meets a squelch threshold.

5. The method of claim 1 wherein said processing step further comprises the step of acoustically reproducing said streaming audio signals.

6. The method of claim 1 wherein said processing step further comprises the step of storing said streaming audio signals.

7. The method of claim 1 wherein said processing step further comprises the step of forwarding said streaming audio signals to a destination on the Internet.

8. The method of claim 1 wherein said Internet server of streaming audio signals provides corresponding embedded data, the method further comprising the step of:
displaying a portion of said embedded data.

9. The method of claim 1 wherein said Internet server of streaming audio signals provides corresponding embedded data, the method further comprising the step of:
extracting said threshold condition indicating the presence of a discrete communications event from said embedded data.

10. The method of claim 9 wherein said threshold condition indicating the presence of a discrete communications event is derived by a digital squelch system utilizing said embedded data, including a source identification code identifying the source of the corresponding audio.

11. The method of claim 1 wherein said list of plural signal source network addresses includes a priority signal source network address, and further comprising the step of:
selecting said priority signal source network address on a more frequent basis than the other signal sources on said list of plural signal network addresses.

12. The method of claim 1 wherein said list of plural signal network addresses includes network addresses and further includes indicia of radio frequencies.

13. The method of claim 1 wherein said selecting and processing steps are accomplished in a network server computer.

14. The method of claim 1 wherein said selecting and processing steps are accomplished in a network client computer.

15. The method of claim 1 wherein said selecting and processing steps are accomplished in a portable computing device.

16. The method of claim 15 wherein said portable computing device includes a scanning radio receiver.

17. The method of claim 1, further comprising the step of:
communicating locally sourced audio content into the Internet.

18. The method of claim 17 wherein said locally sourced audio content is coupled from a radio receiver.

19. The method of claim 17 wherein said locally sourced audio content is coupled from a microphone interface circuit.

20. The method of claim 1 wherein said threshold condition indicating the presence of a discrete communications event is a predetermined level of an indicia of signal amplitude, and further comprising the step of:
adjusting said predetermined level to discriminate between intelligible audio and noise within said streaming audio signals.

21. An apparatus for processing plural streaming audio signals communicated through the Internet and produced by signal sources, including a first signal source that is a first Internet server of streaming audio signals, including intermittent audio content, which is located at an address on the Internet, comprising:
a network interface for receiving the plural audio signals, wherein each contains discrete communications events of intermittent audio content together with extended periods of silence;
a memory;
a processor operable to select the first signal source from a list of plural signal source network addresses stored in said memory, by outputting the Internet address of the first Internet server to said network interface, thereby establishing an Internet connection;
a threshold detector coupled to receive signals through said network interface, having a detector output with an active state that indicates that the received streaming audio signal presently contains a discrete communications event and an inactive state that indicates that the streaming audio signal does not presently contain a discrete communications event, and wherein
said processor is operable to couple the streaming audio content to an output circuit if said detector output is at said active state, and wherein
said processor, upon detecting that said threshold detector output is at said inactive state, is operable to select a second signal source from said list of plural signal source network addresses and establish an Internet connection thereto.

22. The apparatus of claim 21 wherein said processor is operable to establish said Internet connection to said second signal source before said threshold detector output becomes inactive.

23. The apparatus of claim 21, further comprising:
a radio receiver having a squelch gate circuit with an open state that passes receiver audio signals to a receiver audio output if a squelch threshold value is met, and wherein
said processor is operable to select said radio receiver as said second signal source if said threshold detector output is inactive, and operable to couple said receiver audio signals to said output circuit if said squelch gate circuit is in said open state.

24. The apparatus of claim 23 wherein said radio receiver is a scanning radio receiver, and further comprising:
a second memory for storing an indicia of radio frequency therein, and coupled to said processor, and wherein
said processor is operable to recall said indicia of radio frequency and control said scanning radio receiver to receive a radio frequency in accordance therewith.

25. The apparatus of claim 21 wherein said output circuit is an audio frequency amplifier.

26. The apparatus of claim 21 wherein said output circuit is a second memory.

27. The apparatus of claim 21 wherein said output circuit is said network interface.

28. The apparatus of claim 21 wherein the first Internet server of streaming audio signals provides embedded data corresponding to the streaming audio signals, the apparatus further comprising:
   a display coupled to said processor, and wherein
   said processor is operable to display a portion of said embedded data.

29. The apparatus of claim 21 wherein the first Internet server of streaming audio signals provides embedded data corresponding to the streaming audio signals, and wherein said processor is operable to extract said threshold condition from said embedded data.

30. The apparatus of claim 21, and wherein:
   said processor is operable to sequentially select additional present signal sources from amongst said list of plural signal source Internet addresses if said threshold condition is not satisfied, and operable to couple the streaming audio content of said present signal source to said output circuit while said threshold condition is presently satisfied.

31. The apparatus of claim 30 wherein said list of plural signal source Internet addresses additionally includes indicia of radio frequencies.

32. The apparatus of claim 21 wherein said processor is a network server computer.

33. The apparatus of claim 21 wherein said processor is a network client computer.

34. The apparatus of claim 21 wherein said processor is a microcontroller in a scanning radio receiver.

35. The apparatus of claim 21, further comprising:
   a local audio source circuit coupled to said processor having a local audio input, and wherein
   said processor is operable to convert local audio signals from said local audio input into local streaming audio signals, and operable to couple said local streaming audio signals to said network interface for communications into the network.

36. The apparatus of claim 35 wherein said local audio input circuit is a microphone interface circuit having a push-to-talk input, and wherein actuation of said push-to-talk input causes said processor to presently convert and couple said local streaming audio signals to said network interface.

37. The apparatus of claim 35, further comprising:
   a scanning radio receiver having a received signal output coupled to said local audio input.

38. The apparatus of claim 21 wherein said threshold condition is a predetermined level of an indicia of signal amplitude, and further comprising:
   a threshold condition actuator coupled to said processor for adjusting said predetermined level for discrimination between intelligible audio and noise within said streaming audio signals.

39. The apparatus of claim 21 wherein said Internet connection is a peer-to-peer connection.

* * * * *